(12) United States Patent
Tomioka et al.

(10) Patent No.: US 8,144,396 B2
(45) Date of Patent: Mar. 27, 2012

(54) MICROSCOPE APPARATUS

(75) Inventors: Masaharu Tomioka, Hino (JP); Akinori Araya, Yokohama (JP); Toshiyuki Hattori, Hachioji (JP); Yasunari Matsukawa, Saitama (JP); Tatsuo Nakata, Hino (JP)

(73) Assignee: Olympus Corporation, Tokyo (JP)

( * ) Notice: Subject to any disclaimer, the term of this patent is extended or adjusted under 35 U.S.C. 154(b) by 951 days.

(21) Appl. No.: 12/060,994

(22) Filed: Apr. 2, 2008

(65) Prior Publication Data

US 2008/0252967 A1    Oct. 16, 2008

(30) Foreign Application Priority Data

Apr. 10, 2007 (JP) ................ 2007-103088

(51) Int. Cl.
*G02B 21/26* (2006.01)

(52) U.S. Cl. ........................................ 359/391

(58) Field of Classification Search .......... 359/368, 359/391, 395, 381, 398
See application file for complete search history.

(56) References Cited

U.S. PATENT DOCUMENTS

| | | | | |
|---|---|---|---|---|
| 7,130,037 B1 * | 10/2006 | Lange | ........................ | 356/237.2 |
| 2004/0263961 A1 * | 12/2004 | Hummel | ........................ | 359/391 |
| 2007/0285634 A1 * | 12/2007 | Nagasaka et al. | ........................ | 355/30 |
| 2010/0027109 A1 | 2/2010 | Liebel et al. | | |

FOREIGN PATENT DOCUMENTS

| | | |
|---|---|---|
| JP | 03-25598 U | 3/1991 |
| JP | 2004-070307 A | 3/2004 |
| JP | 2004-317661 A | 11/2004 |
| JP | 2005-062687 A | 3/2005 |
| JP | 2005-072404 A | 3/2005 |
| JP | 2005-208626 A | 8/2005 |
| JP | 2005-215114 A | 8/2005 |
| JP | 2006-201605 A | 8/2006 |
| JP | 2006-308746 A | 11/2006 |
| JP | 2010-503030 A | 1/2010 |
| WO | WO 02/093232 A2 | 11/2002 |
| WO | WO 2006/054719 A1 | 5/2006 |
| WO | WO 2006/118189 A1 | 11/2006 |

OTHER PUBLICATIONS

Extended European Search Report dated Jun. 3, 2008, issued in a counterpart European Application.
Japanese Office Action dated Jan. 10, 2012 issued in counterpart Japanese Application No. 2007-103088.

\* cited by examiner

*Primary Examiner* — Alessandro Amari
(74) *Attorney, Agent, or Firm* — Holtz, Holtz, Goodman & Chick, PC

(57) ABSTRACT

An image can be prevented from becoming unclear over time during long-term observation. The invention provides a microscope apparatus including a specimen container for containing a specimen; an objective lens disposed opposite the specimen container for collecting light from the specimen in the specimen container; an immersion-liquid supplying unit for supplying immersion liquid to a space between the objective lens and the specimen container; and an immersion-liquid removing unit for removing the immersion liquid from the space between the objective lens and the specimen container. The immersion-liquid removing unit includes a nozzle for ejecting compressed air to the space between the objective lens and the specimen container.

13 Claims, 6 Drawing Sheets

MICROSCOPE APPARATUS

BACKGROUND OF THE INVENTION

1. Field of the Invention

The present invention relates to microscope apparatuses.

This application is based on Japanese Patent Application No. 2007-103088, the content of which is incorporated herein by reference.

2. Description of Related Art

With a conventional microscope apparatus, there is a known technique for convecting dried air into a space between a specimen and an objective lens to avoid dew formation on the objective lens (for example, see Japanese Unexamined Patent Application, Publication No. 2006-308746).

In the related art, immersion liquid is filled between the objective lens and a specimen as one way to carry out high-resolution microscope observation (for example, see Japanese Unexamined Patent Application, Publication No. 2005-62687). This microscope apparatus includes immersion-liquid supplying means for supplying the immersion liquid to a space between an immersion objective lens and the specimen.

However, when observing a specimen such as a cell for a long time, and when the natural drying and supply of the immersion-liquid are repeated, there is a problem in that staining caused by dried immersion liquid occurs over time on a surface of a container accommodating the specimen, which makes the acquired image unclear.

The present invention provides a microscope apparatus that can prevent an image from becoming unclear over time in long-term observation.

BRIEF SUMMARY OF THE INVENTION

According to one aspect, the present invention provides a microscope apparatus including a specimen container configured to contain a specimen; an objective lens disposed opposite the specimen container and configured to collect light from the specimen in the specimen container; an immersion-liquid supplying unit configured to supply immersion liquid to a space between the objective lens and the specimen container; and an immersion-liquid removing unit configured to remove the immersion liquid from the space between the objective lens and the specimen container, wherein the immersion-liquid removing unit includes a nozzle configured to eject compressed air to the space between the objective lens and the specimen container.

According to the above aspect, high-resolution microscope observation of the specimen can be carried out by collecting the light from the specimen contained in the specimen container by the objective lens while the immersion liquid is supplied to the space between the objective lens and the specimen container by operating the immersion-liquid supplying unit. When the specimen is observed for a long time, by ejecting the compressed air from the nozzle by operating the immersion-liquid removing unit, the immersion liquid remaining in the space between the objective lens and the specimen container is removed by blowing off the immersion liquid. In this way, it is possible to avoid staining caused by the immersion liquid remaining on a surface of the specimen container or an end surface of the objective lens and drying thereon. It is thus possible to continue observing clear images of the specimen for a long time.

The aspect of the invention described above may further include a constant-temperature case configured to contain the specimen container and keep the temperature of the specimen in the specimen container constant.

In this way, the temperature of the specimen in the specimen container disposed inside the constant-temperature case is kept constant, allowing in-vivo observation of the specimen, such as a living cell. Accordingly, even in long-term observation, it is possible to avoid variance of the observation results due to changes in the environment in which the specimen is placed, thus enabling stable observation.

In the configuration described above, the immersion-liquid removing unit may further include an air-temperature adjusting unit configured to adjust the temperature of the compressed air ejected from the nozzle to be substantially the same as that of the specimen.

In this way, the temperature of the compressed air is adjusted by operating the air temperature adjusting unit, and the compressed air whose temperature is substantially the same as that of the specimen is sprayed on the surface of the specimen container to remove the immersion liquid. Because the compressed air whose temperature is substantially the same as that of the specimen is ejected to the specimen container, a change in temperature is not caused in the specimen in the specimen container when the compressed air is ejected. Therefore, the specimen can be maintained in a stable condition without disturbing it.

The aspect of the invention described above may further include an immersion-liquid collecting unit disposed facing the nozzle at a position on the opposite side of the space between the objective lens and the specimen container for collecting the immersion liquid scattered by the compressed air.

By doing so, the immersion liquid which is blown off by the compressed air ejected from the nozzle is collected by the immersion-liquid collecting unit. Accordingly, it is possible to prevent problems such as the removed immersion liquid being scattered and attached to other parts.

In the configuration described above, the immersion-liquid collecting unit may include a receiving holder configured to receive the scattered immersion liquid.

In this way, the immersion liquid blown off by the compressed air is received by the receiving holder, thus avoiding the problem of the immersion liquid being scattered onto other parts.

In the configuration described above, the immersion-liquid collecting unit may include a suction member configured to absorb the scattered immersion liquid.

In this way, because the immersion liquid blown off by the compressed air is absorbed by the suction member, the problem of the immersion liquid being scattered onto other parts is avoided.

The aspect of the invention described above may further include a securing unit configured to secure the specimen container.

In this way, when the immersion liquid is blown off from the nozzle by the compressed air, the specimen container can be held by the action of the securing unit so as not to move even when a pressing force is applied to the specimen container by the compressed air. Accordingly, in the process of removing the immersion liquid during long-term observation, it is possible to prevent the problem of positional shifting of the specimen.

In the aspect of the invention described above, the immersion-liquid removing unit may further include an air filter through which the air ejected from the nozzle is passed.

In this way, foreign objects contained in the compressed air can be removed by the air filter, thus allowing clean compressed air to be ejected.

The present invention affords an advantage in that an image can be prevented from becoming unclear over time during long-term observation.

DETAILED DESCRIPTION OF THE INVENTION

A microscope apparatus 1 according to an embodiment of the present invention will be described below with reference to FIGS. 1 to 3.

Figure 1:
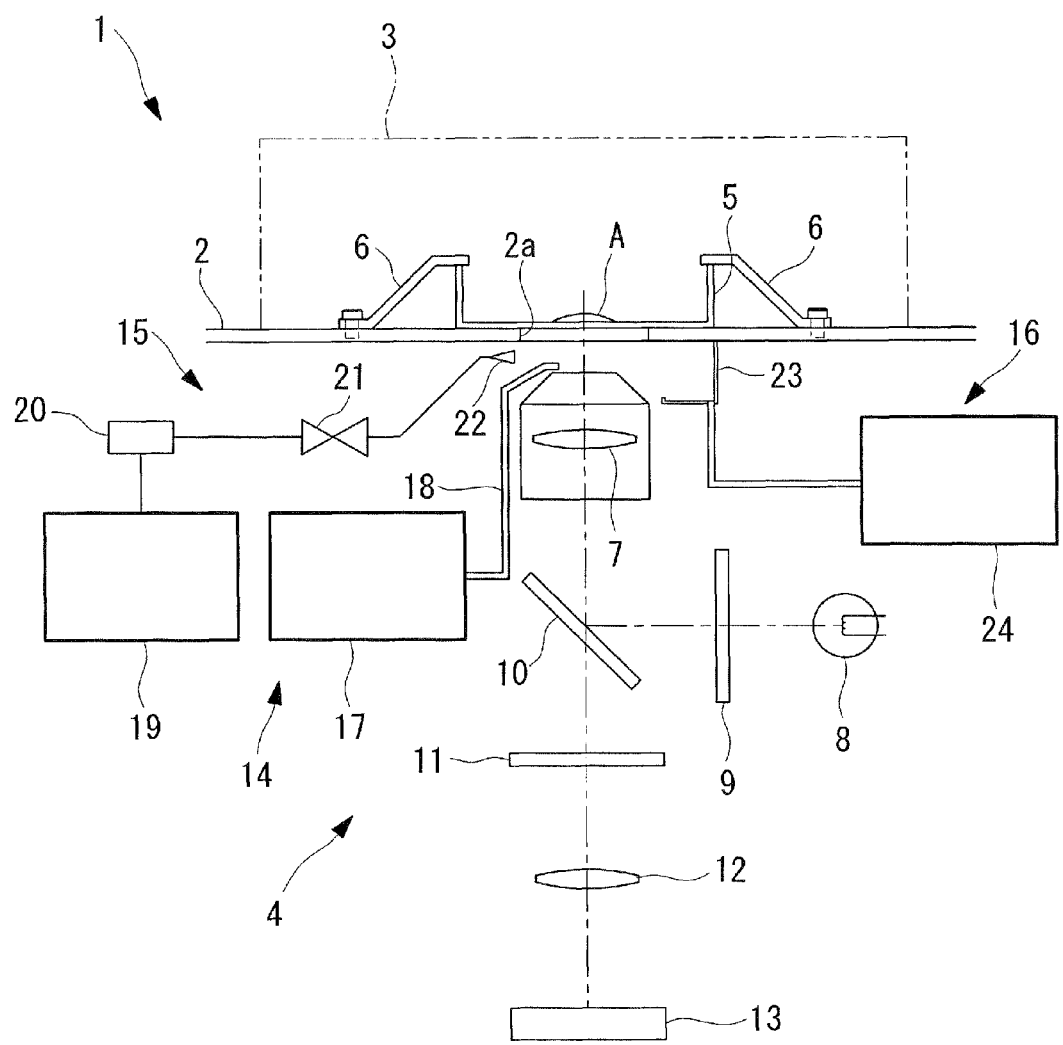
FIG. 1 is a diagram showing the overall configuration of a microscope apparatus according to an embodiment of the present invention.

As shown in FIG. 1, the microscope apparatus 1 according to this embodiment includes a stage 2 which is horizontally disposed, an incubation chamber (constant-temperature case) 3 provided on the stage 2, and a microscope main body 4 disposed below the stage 2.

The stage 2 has a through-hole 2a passing through in the thickness direction thereof. A space inside the incubation chamber 3 above the stage 2 communicates with a space around the microscope main body 4 disposed below the stage 2 via the through-hole 2a.

The environment inside the incubation chamber 3 is maintained at a temperature of 37±1° C. and a humidity of 95% or more by a temperature control device and a humidity control device (not shown in the drawing).

A specimen container 5, which is formed of a transparent material and which contains a specimen A, such as a living cell, is disposed in the incubation chamber 3. The specimen container 5 is positioned in such a manner that the bottom surface thereof, on which the specimen A is attached, covers the through-hole 2a of the stage 2, thus allowing the through-hole 2a to be closed off so as to separate the space inside the incubation chamber 3 from the space around the microscope main body 4.

The specimen container 5 is secured so as not to move by being held between an upper surface of the stage 2 and clips 6 that are attached to the stage 2.

The microscope main body 4 includes an objective lens 7 disposed opposite the bottom surface of the specimen container 5 placed on the stage 2, with the through-hole 2a disposed therebetween; a light source 8 for generating illumination light that irradiates the specimen A via the objective lens 7; an excitation filter 9 for extracting excitation light having a predetermined wavelength band from the illumination light emitted from the light source 8; a dichroic mirror 10 for splitting off from the excitation light fluorescence emitted from the specimen A, which is collected by the objective lens 7; a barrier filter 11 for blocking the excitation light transmitted through the dichroic mirror 10; an image-forming lens 12 for imaging the fluorescence transmitted through the barrier filter 11; and an image-acquisition device 13, such as a CCD, whose image-acquisition surface is disposed at the position of the image formed by the image-forming lens 12.

In addition, a raising and lowering mechanism (not shown in the drawing) is provided for the objective lens 7. By operating the raising and lowering mechanism, the objective lens 7 is moved in the optical axis direction, which is oriented vertically.

The microscope main body 4 also includes an immersion-liquid supplying unit 14 for supplying immersion liquid to a gap between the objective lens 7 and the specimen container 5; an immersion-liquid removing unit 15 for removing the immersion liquid from the gap between the objective lens 7 and the specimen container 5; and an immersion-liquid collecting unit 16 for collecting the removed immersion liquid.

The immersion-liquid supplying unit 14 includes a supply tank 17, which stores the immersion liquid and in which a pump (not shown in the drawing) is installed; and a feeding tube 18 for guiding the immersion liquid that is taken out of the supply tank 17 to the gap between the objective lens 7 and the specimen container 5. A heating unit (not shown in the drawing) is preferably provided in the supply tank 17 or at the feeding tube 18 for heating the immersion liquid to a temperature substantially the same as that of the specimen A.

The immersion-liquid removing unit 15 includes a pneumatic pressure source 19 for generating compressed air; a heater 20 for heating the compressed air generated at the pneumatic pressure source 19; a valve 21 for turning ON/OFF of the flow of compressed air heated by the heater 20; and a nozzle 22, which is disposed pointing toward the gap between the objective lens 7 and the specimen container 5 and which ejects the compressed air in substantially the horizontal direction.

Figure 2:
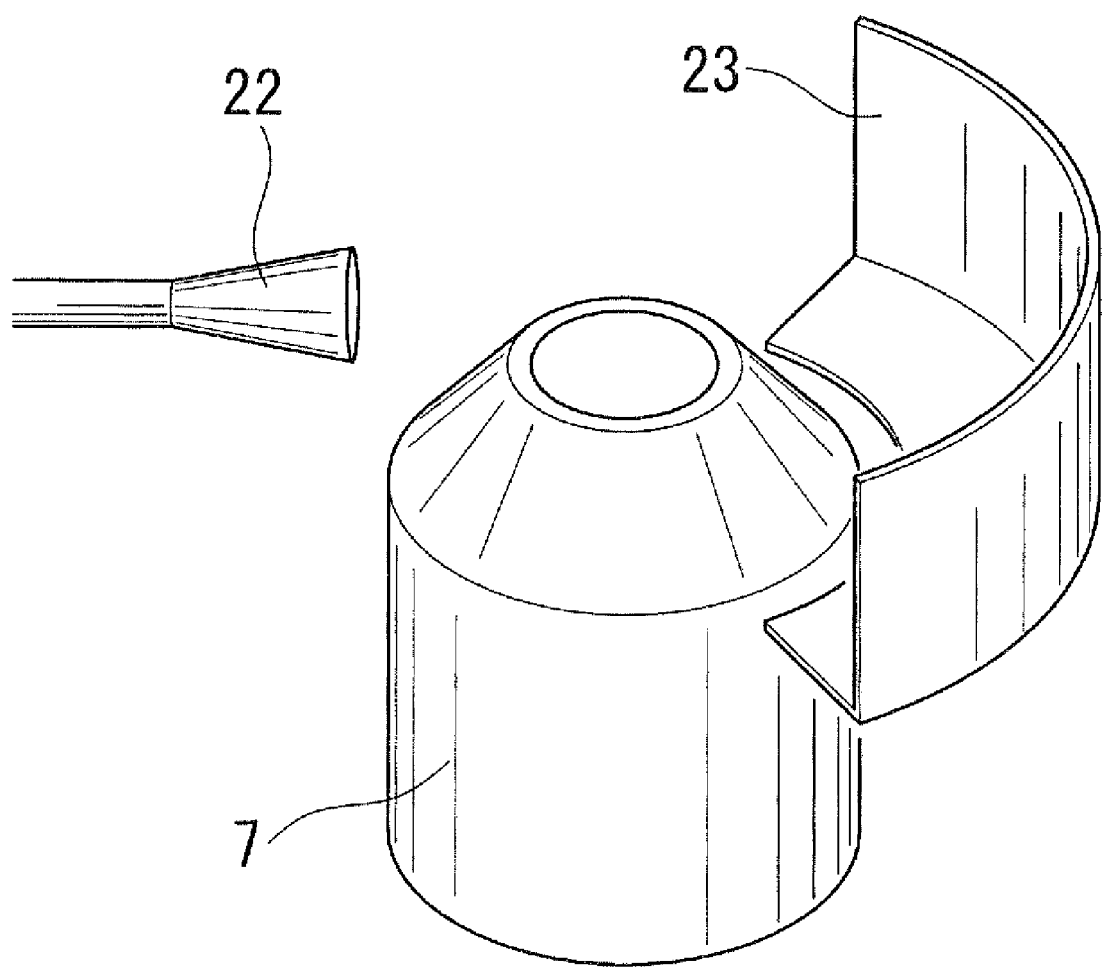
FIG. 2 is a perspective view showing the positional relationship between a nozzle and a receiving holder for an objective lens of the microscope apparatus in FIG. 1.
Figure 3:
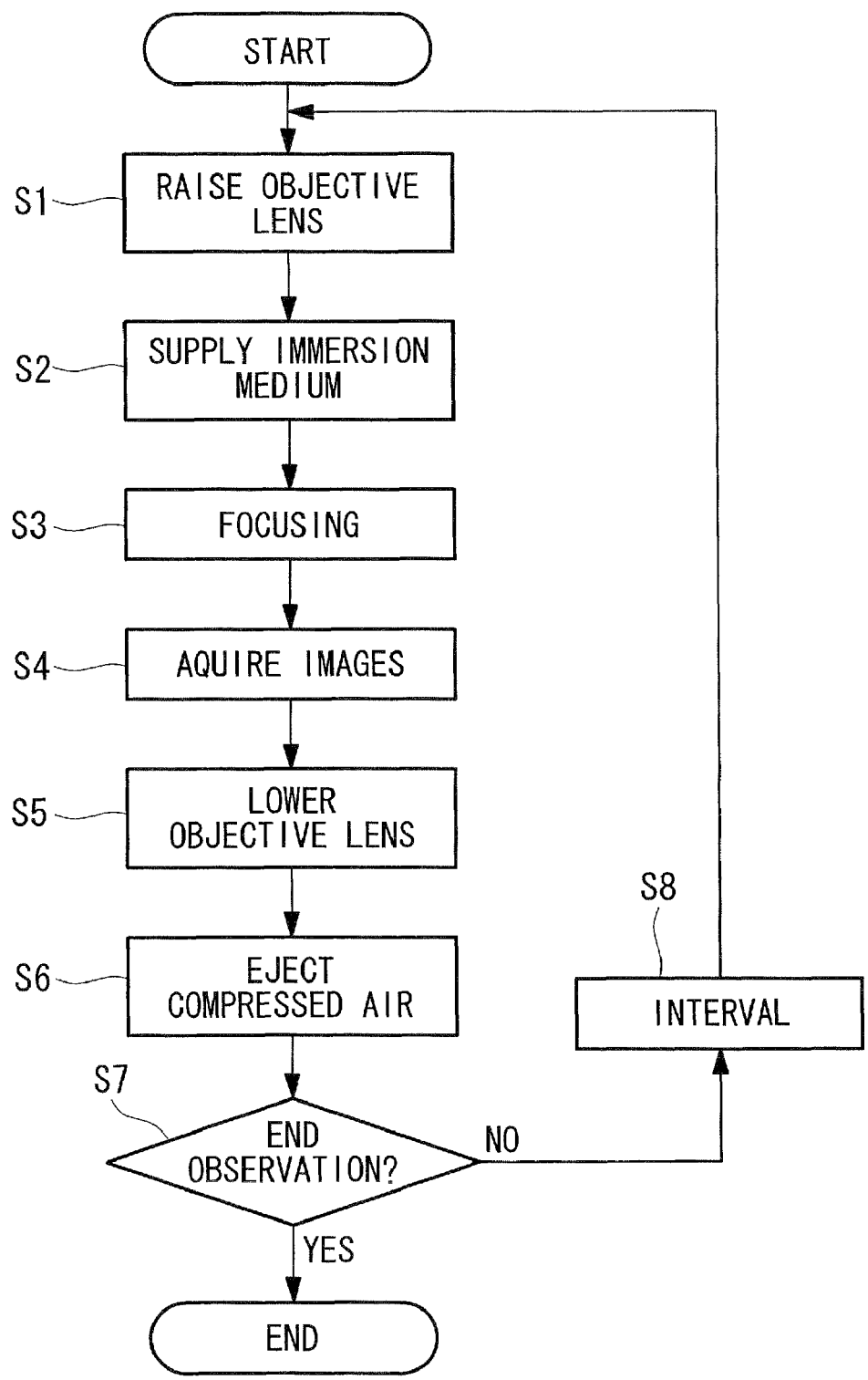
FIG. 3 is a flow chart for explaining the operation of the microscope apparatus in FIG. 1.

As shown in FIGS. 1 and 2, the immersion-liquid collecting unit 16 includes a receiving holder 23 disposed facing the nozzle 22 in the horizontal direction, at a position on the opposite side of the gap between the objective lens 7 and the specimen container 5; and a drain tank 24 for storing the immersion liquid received by the receiving holder 23. As shown in FIG. 2, the receiving holder 23 is formed in an arc shape around a predetermined region of the circumference of the objective lens 7 to cover a wider region where the immersion liquid is scattered when blown by the air from the nozzle 22.

The operation of the microscope apparatus 1 according to this embodiment, having such a configuration, will be described below.

In order to carry out long-term observation of a specimen A, such as a living cell, using the microscope apparatus 1 according to this embodiment, the specimen A contained in the specimen container 5 is disposed in the incubation chamber 3 on the stage 2, as shown in FIG. 1. By doing so, the through-hole 2a in the stage 2 is closed off by the bottom surface of the specimen container 5.

In this state, the temperature and humidity inside the incubation chamber 3 are set to 37±1° C. and 95% or more, respectively. Because the through-hole 2a is closed off by the bottom surface of the specimen container 5, the air inside the incubation chamber 3 does not leak out to the space in the microscope main body 4, thus avoiding high-temperature and high-humidity conditions in the microscope main body 4. Once preparations for observation have been completed in this way, the specimen A can be observed for a long time while maintaining normal conditions.

In this state, the objective lens 7 is raised to approach a predetermined position with respect to the specimen container 5 (Step S1), and the immersion liquid is supplied, by operating the immersion-liquid supplying unit 14, to a gap between the end surface of the objective lens 7 and the bottom surface of the specimen container 5 (Step S2). Then, the illumination light from the light source 8 irradiates the specimen A via the objective lens 7, and the focal position is aligned with the specimen A by finely moving the objective lens 7 in the vertical direction (Step S3).

The excitation light having a specific wavelength, which is emitted from the light source 8 and selected by the excitation filter 9, irradiates the specimen A via the objective lens 7. The fluorescence emitted from the specimen A is collected by the objective lens 7 and is acquired by the image-acquisition device 13 via the dichroic mirror 10, the barrier filter 11, and the image-forming lens 12 (Step S4). In this way, one frame image is obtained.

Then, the objective lens 7 is lowered once a series of frame images is acquired, for example, acquiring frame images in which the excitation light having different wavelengths is irradiated by switching the excitation filter 9, or acquiring frame images of different focal planes by moving the objective lens 7 vertically (Step S5).

By doing so, the gap between the objective lens 7 and the specimen container 5 can be increased by a certain amount. In this state, the compressed air is ejected from the nozzle 22 by operating the immersion-liquid removing unit 15 (Step S6).

In this case, the compressed air ejected from the nozzle 22 blows off the immersion liquid that is attached to the end surface of the objective lens 7 and the surface of the specimen container 5. The blown-off immersion liquid tends to scatter as a spray; however, because the receiving holder 23 is disposed on the opposite side of the gap between the objective lens 7 and the specimen container 5 in such a manner as to surround the region in a arc-shape, almost all of the sprayed immersion liquid is received by the receiving holder 23, thus avoiding scattering it to other parts.

Then, when a certain amount of the immersion liquid is received by the receiving holder 23, the immersion liquid flows into the receiving holder 23 and is collected in the drain tank 24 connected to the receiving holder 23.

Thereafter, it is determined whether or not the entire process for long-term observation is completed (Step S7). If it is not completed, the process returns to Step S1 to repeat the observation after a predetermined time interval (Step S8).

With the microscope apparatus 1 according to this embodiment, in long-term observation in which the observation is repeatedly carried out for a long time at predetermined time intervals, the immersion liquid is blown off by the compressed air by operating the immersion-liquid removing unit 15 in each interval. Accordingly, the immersion liquid can be reliably prevented from remaining on the end surface of the objective lens 7 or the surface of the specimen container 5. Staining occurs when the immersion liquid remains on the surfaces and dries, causing the end surface of the objective lens 7 or the surface of the specimen container 5 to become hazy, which makes the acquired image unclear. According to this embodiment, however, the immersion liquid does not remain thereon; therefore, an advantage is afforded in that it is possible to prevent such a problem and to eliminate regular cleaning or the like.

In addition, with the microscope apparatus 1 according to this embodiment, because the compressed air ejected from the nozzle 22 is heated by the heater 20 to substantially the same temperature as that of the specimen A, it is possible to keep the temperature of the specimen A constant by ejecting the compressed air to remove the immersion liquid. In particular, when compressed air whose temperature is significantly different from that of the specimen A is ejected onto the surface of the specimen container 5, a stimulus may be applied to the specimen A, causing its condition to change. According to this embodiment, however, an advantage is afforded in that it is possible to prevent such a problem and to observe the specimen A while stably maintaining the condition thereof for a long time.

With the microscope apparatus 1 according to this embodiment, because the receiving holder 23 is disposed facing the nozzle 22 at a position on the opposite side of the gap between the objective lens 7 and the specimen container 5, it is possible to reliably prevent the immersion liquid blown off from the nozzle 22 by the compressed air from scattering in the form of a spray.

With the microscope apparatus 1 according to this embodiment, because the specimen container 5 is secured to the stage 2 by the clips 6, it is held so as not to move on the stage 2 even when a pressing force is applied to the specimen container 5 by the compressed air. As a result, the position of the specimen A to be observed can be maintained when carrying out multiple observations at predetermined intervals.

In this embodiment, before ejecting the compressed air, the objective lens 7 is lowered relative to the specimen container 5 to increase the gap therebetween. Accordingly, the pressing force which is applied to the specimen container 5 by ejecting the compressed air can be reduced, thus suppressing further movement of the specimen container 5.

Figure 4:
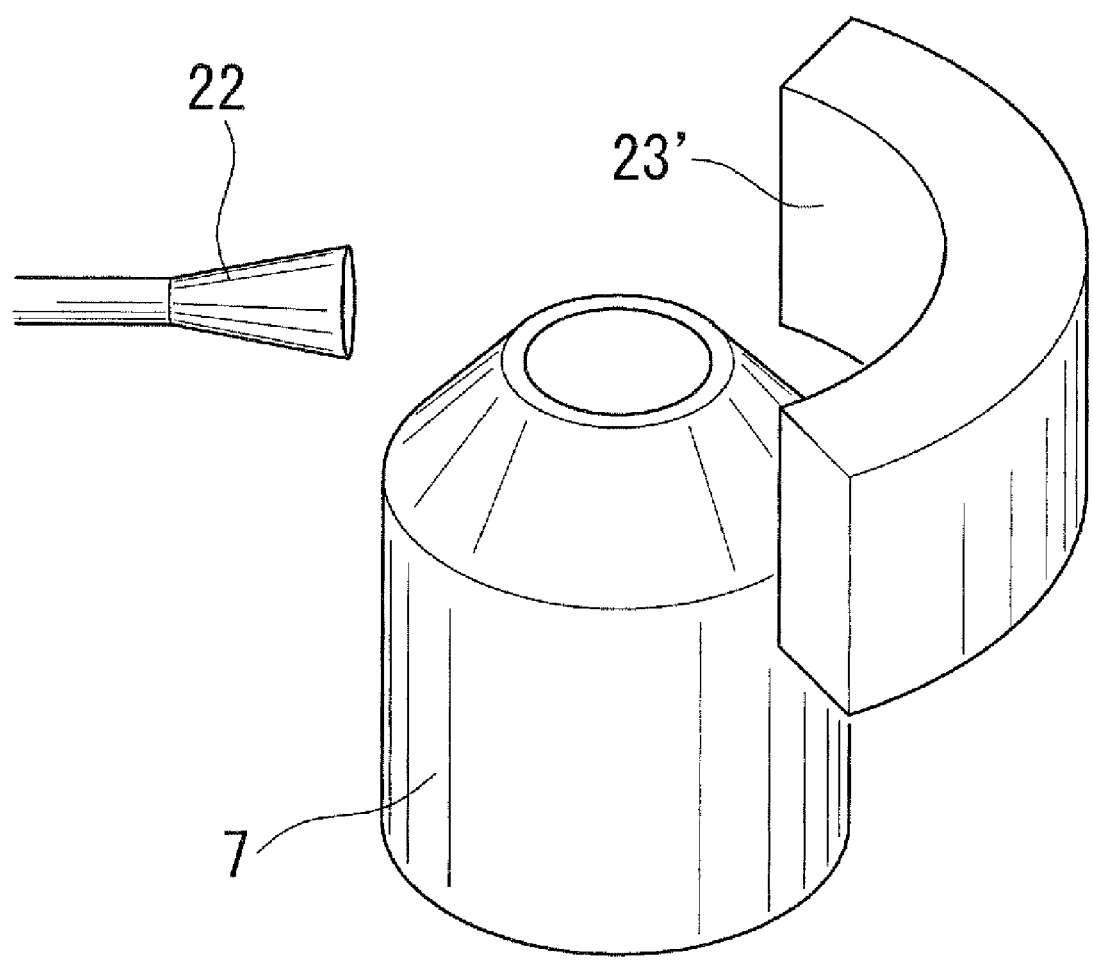
FIG. 4 is a perspective view showing a modification of an immersion-liquid removing unit of the microscope apparatus in FIG. 1.

In this embodiment, the receiving holder 23 which receives the immersion liquid blown off by the compressed air is provided. Instead of this, however, a suction member 23', such as a sponge, may be disposed as shown in FIG. 4.

Figure 5:
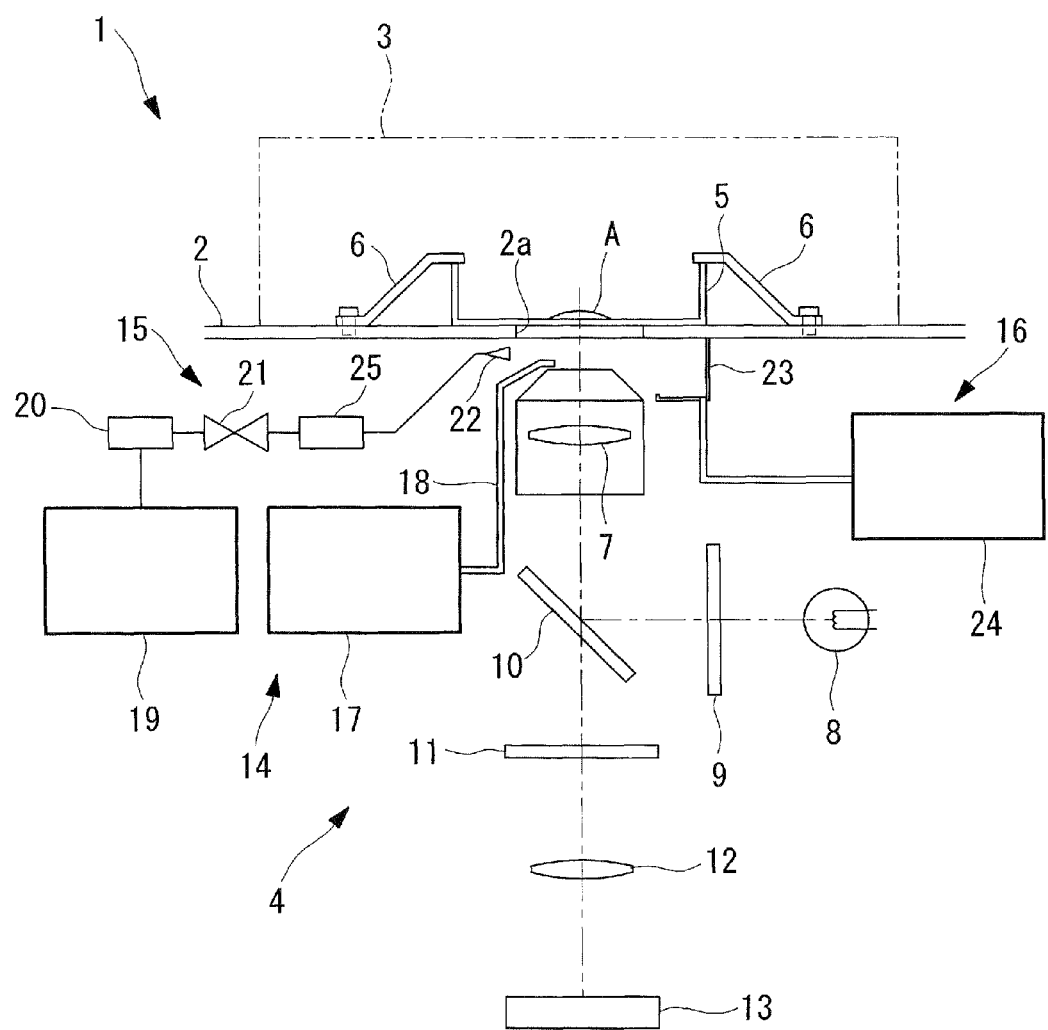
FIG. 5 is a diagram showing the overall configuration of a modification of the microscope apparatus in FIG. 1.

In addition, as shown in FIG. 5, an air filter 25 may be disposed in a pipe between the pneumatic pressure source 19 and the nozzle 22 to remove dust in the compressed air ejected from the nozzle 22. In this way, clean compressed air can be ejected to the objective lens 7 and the specimen container 5. Therefore, it is possible to prevent the problem of dust adhering on the end surface of the objective lens 7 or the surface of the specimen container 5, and to prevent a reduction in cleanliness rating of the space where the microscope main body 4 is disposed.

Figure 6:
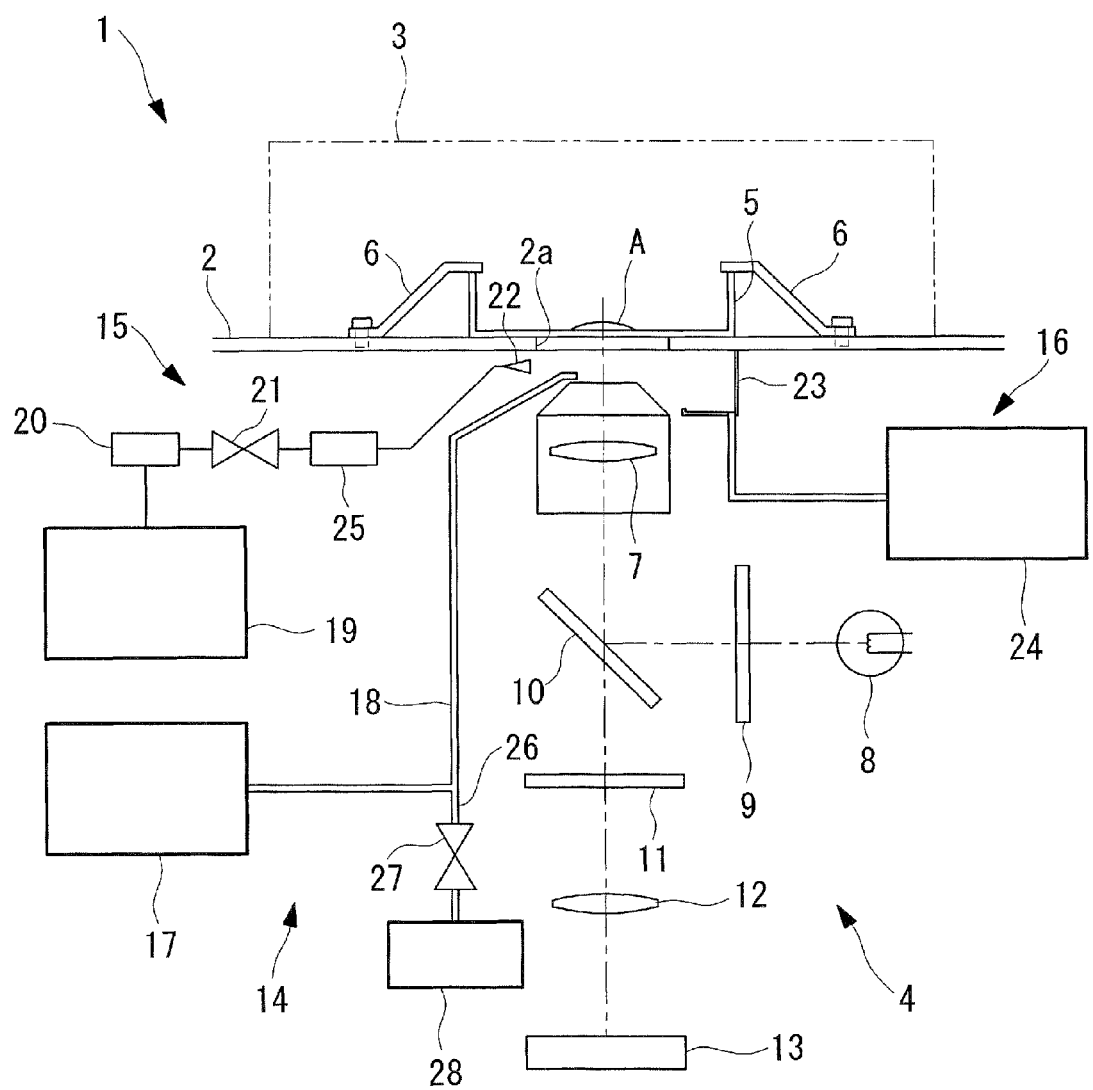
FIG. 6 is a diagram showing the overall configuration of another modification of the microscope apparatus in FIG. 1.

In this embodiment, as shown in FIG. 6, a drain tube 26 may be connected to the feeding tube 18 which supplies the immersion liquid from the supply tank 17, and a valve 27 and a drain outlet 28 may be provided at the drain tube 26. The valve 27 is kept in a closed state during operation and is opened by turning off the power.

In this way, when the immersion liquid is not supplied from the supply tank 17 because a pump is stopped due to, for example, a power failure, the valve 27 is opened, thus allowing the immersion liquid in the feeding tube 18 to be discharged to the drain outlet 28.

What is claimed is:
1. A microscope apparatus comprising:
a specimen container configured to contain a specimen;
an objective lens disposed opposite the specimen container and configured to collect light from the specimen in the specimen container;
an immersion-liquid supplying unit configured to supply immersion liquid to a space between the objective lens and the specimen container; and
an immersion-liquid removing unit configured to remove substantially all of the immersion liquid from the space between the objective lens and the specimen container,
wherein the immersion-liquid removing unit includes a nozzle configured to eject compressed air to the space between the objective lens and the specimen container.

2. A microscope apparatus according to claim 1, further comprising a constant-temperature case configured to contain the specimen container and keep a temperature of the specimen in the specimen container constant.

3. A microscope apparatus according to claim 2, wherein the immersion-liquid removing unit further includes an air-temperature adjusting unit configured to adjust a temperature of the compressed air ejected from the nozzle to be substantially the same as the temperature of the specimen.

4. A microscope apparatus according to claim 1, further comprising an immersion-liquid collecting unit disposed facing the nozzle at a position on an opposite side of the space between the objective lens and the specimen container and configured to collect the immersion liquid scattered by the compressed air.

5. A microscope apparatus according to claim 4, wherein the immersion-liquid collecting unit includes a receiving holder configured to receive the scattered immersion liquid.

6. A microscope apparatus according to claim 4, wherein the immersion-liquid collecting unit includes a suction member configured to absorb the scattered immersion liquid.

7. A microscope apparatus according to claim 1, further comprising a securing unit configured to secure the specimen container.

8. A microscope apparatus according to claim 1, wherein the immersion-liquid removing unit further includes an air filter through which the air ejected from the nozzle is passed.

9. A microscope apparatus according to claim 1, wherein the nozzle is pointed directly toward the space between the objective lens and the specimen container.

10. A microscope apparatus according to claim 1, wherein the nozzle is oriented to direct the compressed air substantially horizontally between the objective lens and the specimen container.

11. A microscope apparatus comprising:
a specimen container configured to contain a specimen;
an objective lens disposed opposite the specimen container and configured to collect light from the specimen in the specimen container;
means for supplying immersion liquid to a space between the objective lens and the specimen container; and
means for removing substantially all of the immersion liquid from the space between the objective lens and the specimen container, including a nozzle configured to eject compressed air to the space between the objective lens and the specimen container.

12. A microscope apparatus according to claim 11, wherein the nozzle is pointed directly toward the space between the objective lens and the specimen container.

13. A microscope apparatus according to claim 11, wherein the nozzle is oriented to direct the compressed air substantially horizontally between the objective lens and the specimen container.

* * * * *